(12) United States Patent
Glinec et al.

(10) Patent No.: US 11,624,655 B2
(45) Date of Patent: Apr. 11, 2023

(54) DENTAL 3D SCANNER WITH ANGULAR-BASED SHADE MATCHING

(71) Applicant: CARESTREAM DENTAL TECHNOLOGY TOPCO LIMITED, London (GB)

(72) Inventors: Yannick Glinec, Montevrain (FR); Victor C. Wong, Pittsford, NY (US); James R. Milch, Penfield, NY (US)

(73) Assignee: Dental Imaging Technologies Corporation, Quakertown, PA (US)

( * ) Notice: Subject to any disclaimer, the term of this patent is extended or adjusted under 35 U.S.C. 154(b) by 0 days.

(21) Appl. No.: 17/054,970

(22) PCT Filed: May 17, 2019

(86) PCT No.: PCT/IB2019/000682
§ 371 (c)(1),
(2) Date: Nov. 12, 2020

(87) PCT Pub. No.: WO2019/220212
PCT Pub. Date: Nov. 21, 2019

(65) Prior Publication Data
US 2021/0215539 A1 Jul. 15, 2021

Related U.S. Application Data

(60) Provisional application No. 62/673,390, filed on May 18, 2018.

(51) Int. Cl.
*G01J 3/50* (2006.01)
*G01J 3/46* (2006.01)
(Continued)

(52) U.S. Cl.
CPC ............... *G01J 3/508* (2013.01); *G01J 3/463* (2013.01); *G01J 3/504* (2013.01); *G06T 7/0012* (2013.01);
(Continued)

(58) Field of Classification Search
None
See application file for complete search history.

(56) References Cited

U.S. PATENT DOCUMENTS 7,319,467 B2   1/2008   Weyrich et al.
7,341,450 B2   3/2008   Pye et al.
(Continued)

FOREIGN PATENT DOCUMENTS

JP   2005-111266 A   4/2005
JP   2006-277748 A   10/2006
(Continued)

OTHER PUBLICATIONS

Brian Curless et al., "A Volumetric Method for Building Complex Models from Range Images," Proceedings of SIGGRAPH96, 303-312 (1996).
(Continued)

*Primary Examiner* — Anh-Tuan V Nguyen
(74) *Attorney, Agent, or Firm* — Alston & Bird LLP

(57) ABSTRACT

A method for color shade matching obtains a 3D tooth surface representation using an intraoral scanner wherein the 3D tooth surface representation comprises surface data and a spatially resolved angular distribution of color vectors, wherein the spatially resolved angular distribution of color vectors associates one or more point positions from the surface data to the corresponding angular distribution of color vectors. The method identifies one or more shade values, where each shade value is associated with one angular distribution of color vectors from the spatially
(Continued)

resolved angular distribution of color vectors, by comparing the angular distribution of color vectors to a set of reference angular distributions of color vectors, wherein each reference angular distribution in the set is associated with a corresponding shade value. The method displays, stores, or transmits the surface data with an indication of the one or more shade values.

22 Claims, 10 Drawing Sheets

(51) Int. Cl.
  *G06T 17/00* (2006.01)
  *G06T 7/90* (2017.01)
  *G06T 7/00* (2017.01)

(52) U.S. Cl.
  CPC .......... *G06T 7/90* (2017.01); *G06T 17/00* (2013.01); *G06T 2200/04* (2013.01); *G06T 2200/08* (2013.01); *G06T 2200/24* (2013.01); *G06T 2207/30036* (2013.01)

(56) References Cited

U.S. PATENT DOCUMENTS

| | | | |
|---|---|---|---|
| 7,492,927 | B2 | 2/2009 | Marschner et al. |
| 9,295,532 | B2 | 3/2016 | Milch |
| 9,349,182 | B2 | 5/2016 | Milch |
| 2002/0021439 | A1* | 2/2002 | Priestley ............. G01J 3/46 356/243.5 |
| 2005/0196039 | A1* | 9/2005 | Bengel ............... G06T 7/90 382/162 |
| 2006/0105179 | A1* | 5/2006 | Hofman ............. A61K 6/887 428/423.1 |
| 2009/0128561 | A1* | 5/2009 | Cooper .............. G06T 15/80 345/426 |
| 2010/0311005 | A1* | 12/2010 | Liang ................ A61B 5/1079 433/29 |
| 2012/0032973 | A1* | 2/2012 | Sano ................. G01J 3/504 345/593 |
| 2012/0293539 | A1* | 11/2012 | Shim ................. G06T 19/20 345/593 |
| 2014/0105480 | A1* | 4/2014 | Motomura .......... G06V 20/695 382/133 |
| 2015/0079327 | A1* | 3/2015 | Kautz ................ B33Y 50/02 428/80 |
| 2016/0318259 | A1* | 11/2016 | Seto ................. H04N 1/6094 |
| 2017/0165038 | A1* | 6/2017 | Esbech ............. G01J 3/504 |
| 2017/0208311 | A1* | 7/2017 | Wachi .............. G06V 10/44 |
| 2017/0245962 | A1* | 8/2017 | Skamser ........... G02B 5/0257 |
| 2018/0047208 | A1* | 2/2018 | Marin .............. H04N 13/243 |

FOREIGN PATENT DOCUMENTS

| | | |
|---|---|---|
| JP | 2007-219715 A | 8/2007 |
| JP | 2011-170891 A | 9/2011 |
| WO | 2015/118120 A1 | 8/2015 |

OTHER PUBLICATIONS

International Preliminary Report on Patentability received for PCT Patent Application No. PCT/IB2019/000682, dated Dec. 3, 2020, 9 pages.
International Search Report and Written Opinion received for PCT Patent Application No. PCT/IB2019/000682, dated Nov. 27, 2019, 11 pages.
Michael Kazhdan et al., "Screened Poisson Surface Reconstruction," ACM Transactions on Graphics, 32(3):1-13, (2013).
Radu Rusu, "Semantic 3D Object Maps for Everyday Manipulation in Human Living Environments," Dissertation, 284 pages, (Aug. 17, 2009).
Rosana Montes et al., "An Overview of BRDF Models," Technical Report LSI-2012-001, 1-26 (2012).
Wen Luo et al., "Assessing Gloss of Tooth using Digital Imaging," CGIV 2008 and MSC'08 Final Program and Proceedings, 307-311, (Jan. 2008).
Wojciech Matusik et al., "A Data-Driven Reflectance Model," ACM SIGGRAPH 2003 Papers, 759-769, (Jul. 2003).
Office Action received for Japanese Patent Application No. 2020-564545, dated Jan. 31, 2023, 3 pages (English Translation only).

* cited by examiner

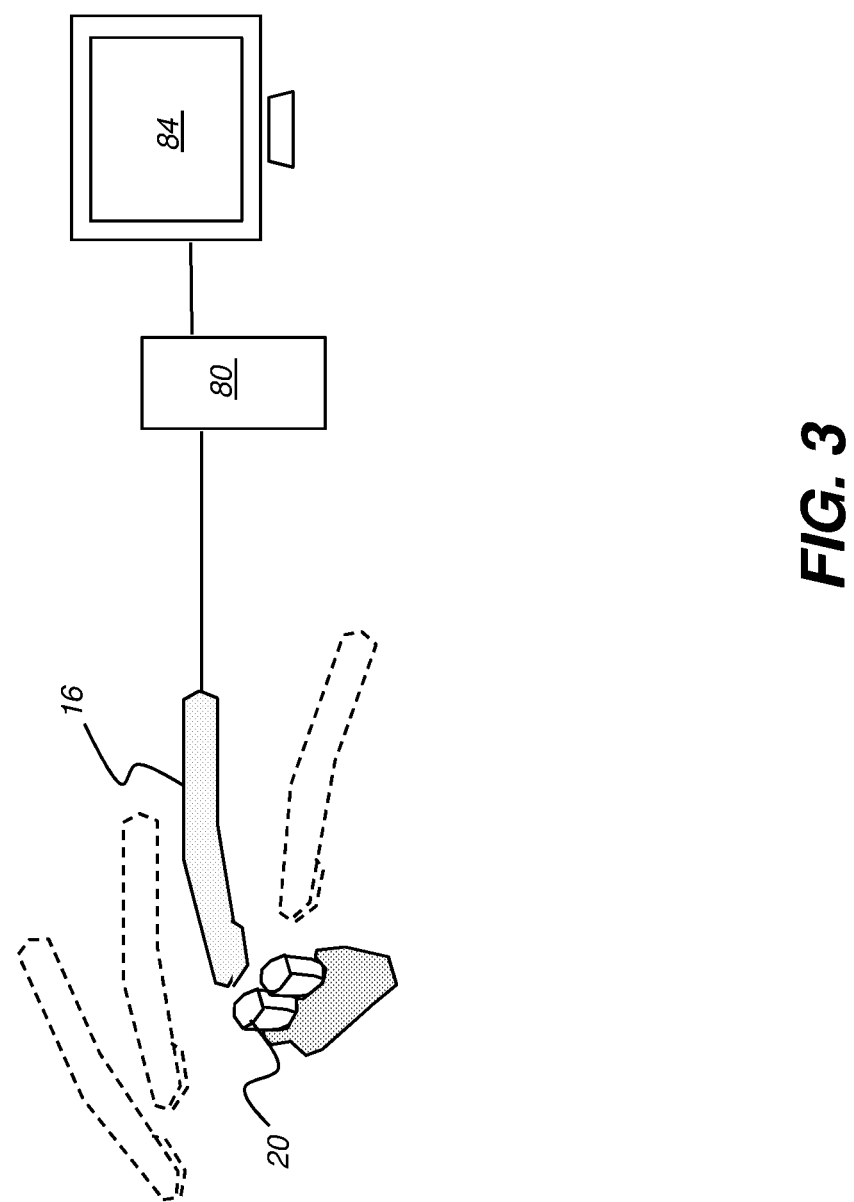

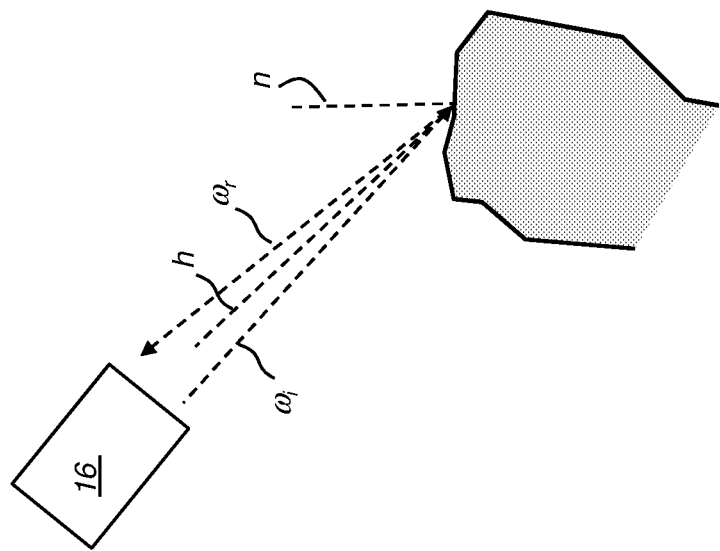

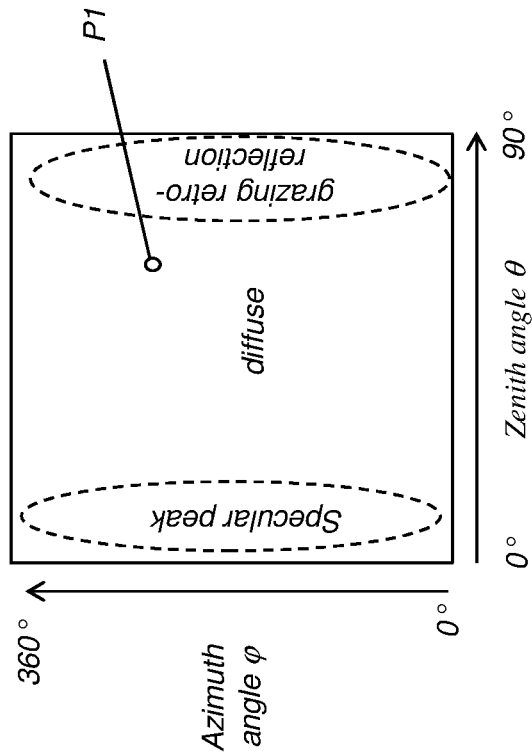
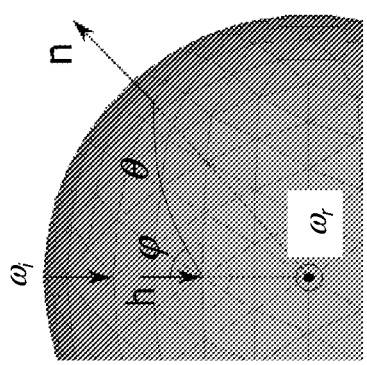
FIG. 4B

DENTAL 3D SCANNER WITH ANGULAR-BASED SHADE MATCHING

TECHNICAL FIELD

The disclosure relates generally to dental 3D scanners and more particularly to intraoral scanning methods and apparatus that acquire information related to spatial and angular variation of dental color shade.

BACKGROUND

Accurately modeling the color shade of teeth is particularly valued for patient appearance and satisfaction in restorative dentistry. In conventional practice, the dental technician or practitioner approximates the color and overall appearance of the tooth using sets of shade tabs. Shade tabs for dental color are often provided by suppliers of restorative materials and show the available color tints or color range that is available for the filling, crown, implant, bridge, or other restorative feature. Even with the aid of a well-stocked set of dental shade tabs, however, color shade decisions can be difficult to make and subject to human error; the overall accuracy of a dental shade decision often depends on the relative experience and aesthetic taste of the practitioner.

Approaches to help automate the process and make the color shade decision less confusing and less error-prone include techniques such as colorimetric imaging, use of specially designed spectrophotometer systems, and shade and texture mapping using 3D (three-dimensional) scanning apparatus. While these methods have achieved some level of success, there is still dissatisfaction with time-consuming procedures, expense, and often disappointing results, even from high-end systems.

Thus, it can be appreciated that there is a need for methods and apparatus that provide accurate characterization of tooth color shade, especially during the execution of intraoral 3D scanning.

SUMMARY

An object of the present invention is to advance the art of dental 3D scanning. With this object in mind, it is recognized that there would be particular value with systems and techniques that address known deficiencies of the art as conventionally practiced.

These objects are given only by way of illustrative example, and such objects may be exemplary of one or more embodiments of the invention. Other desirable objectives and advantages inherently achieved by the disclosed methods may occur or become apparent to those skilled in the art. The invention is defined by the appended claims.

According to one aspect of the disclosure, there is provided a method for intraoral 3D scanning comprising:

a) obtaining a 3D tooth surface representation using an intraoral scanner wherein the 3D tooth surface representation comprises surface data and a spatially resolved angular distribution of color vectors, wherein the spatially resolved angular distribution of color vectors associates one or more point positions from the surface data to the corresponding angular distribution of color vectors;

b) identifying one or more shade values, where each shade value is associated with an angular distribution of color vectors from the spatially resolved angular distribution of color vectors, by comparing the angular distribution of color vectors to a set of reference angular distributions of color vectors, wherein each reference angular distribution in the set is associated with a corresponding shade value; and c) displaying, storing, or transmitting the surface data with an indication of the one or more shade values.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other.

FIG. 3 is a schematic diagram showing an intraoral imaging probe at different positions relative to a tooth.

FIG. 4A is a schematic diagram that shows basic geometry for Bi-Directional Reflectance Distribution Function (BRDF) variables.

FIG. 4B is a schematic diagram that shows the definition of polar angles and how the measured reflectance data for a surface portion is schematically represented.

DETAILED DESCRIPTION OF THE EMBODIMENTS

Figure 1:
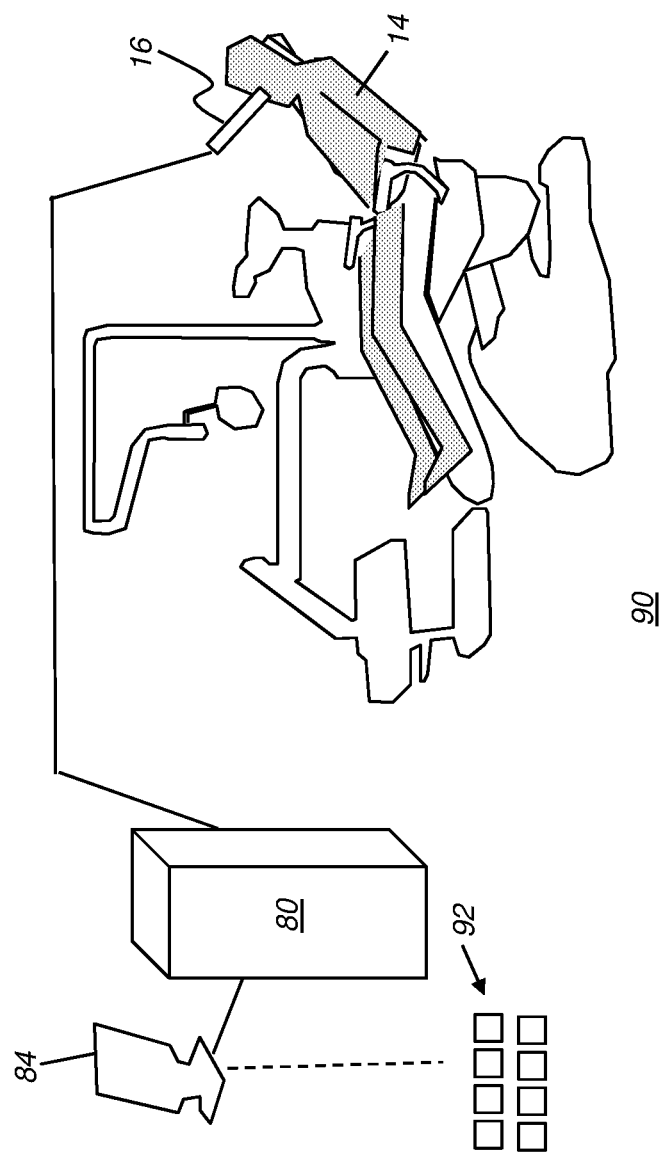
FIG. 1 is a schematic diagram that shows an imaging apparatus for shade matching according to an embodiment of the present disclosure.

The following is a detailed description of the preferred embodiments, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

As used herein, the term "energizable" relates to a device or set of components that perform an indicated function upon receiving power and, optionally, upon receiving an enabling signal.

In the context of the present disclosure, the terms "viewer", "operator", and "user" are considered to be equivalent and refer to the viewing practitioner, technician, or other person who views and manipulates an image, such as a dental image, on a display monitor. An "operator instruction" or "viewer instruction" is obtained from explicit commands entered by the viewer, such as by clicking a button on a camera or by using a computer mouse or by touch screen or keyboard entry.

In the context of the present disclosure, the phrase "in signal communication" indicates that two or more devices and/or components are capable of communicating with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

The term "set", as used herein, refers to a non-empty set, as the concept of a collection of elements or members of a set is widely understood in elementary mathematics. The terms "subset" or "partial subset", unless otherwise explicitly stated, are used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, "surface data" can include surface contour characterization in the form of a point cloud, a polygonal mesh, or other surface representation or image. Surface data can include views of surface contour such as a dynamically growing surface contour actively assembled by the imaging system during data acquisition and can include reduced-resolution imaging that represents surface contour. Surface data can alternately be generated as part of a refinement step, the result of additional data acquisition or computation. High resolution surface data is typically needed by a technician for accurate design of a restorative appliance. According to an embodiment of the present disclosure, surface data can include 2D surface information derived from acquired 3D scan data. Preferably, surface data is defined within the same coordinate system used for calculation of a spatially resolved angular distribution of color vectors, as described in more detail subsequently.

An angular distribution of color vectors describes a mapping that relates angular coordinates to a corresponding color vectors, wherein the angular coordinates depend on the illumination direction, observation direction, and a surface normal, and color vectors represent values in a standard color space, such as RGB, CIELab XYZ (defined by the International Commission on Illumination), or a visible spectrum. According to an embodiment of the present disclosure, an angular distribution of color vectors can be represented by a BRDF (Bi-Directional Reflectance Distribution Function) structure or a BRDF snapshot.

In the context of the present disclosure, the phrase "spatially resolved angular distribution of color vectors" describes an angular distribution of color vectors having a spatial variation. The spatial variation is used to parameterize the variation of the optical response of a tooth over its surface.

The spatially resolved angular distribution of color vectors is a function which relates spatial coordinates to a corresponding angular distribution of color vectors. This function is used to associate spatial coordinates of one or more points from the surface data with the corresponding angular distribution of color vectors. The spatially resolved angular distribution of color vectors can provide continuous or discrete variation of the corresponding angular distribution of color vectors with a variation of the spatial coordinates.

In one embodiment, a single data acquisition is used to generate both the surface data and the spatially resolved angular distribution of color vectors. From the data acquisition, it is possible to generate surface data in the form of a dynamically growing surface contour or a as part of a refinement step. The same part or another subset of the data acquisition is used to obtain the spatially resolved angular distribution of color vectors. Because a unique data acquisition is used, the underlying coordinate system for the surface data and for the spatially resolved angular distribution of color vectors will be likely the same. The benefit for the user is a better experience where the scan in the patient mouth is completely separated from the review on the screen which requires the user attention before generating the report and closing the case.

In another embodiment, the spatially resolved angular distribution of color vectors is obtained from a data acquisition which is separate from the surface data. A first data acquisition could provide surface data and a second scan acquisition could provide the spatially resolved angular distribution of color vectors used for determining the shade. Indeed, one might not need to collect shade data on the entire surface of the first data acquisition. Usually shade accuracy is important on incisors and canines which are visible during a smile. Acquiring shade data on molars or on the lingual side of a tooth is more optional. By acquiring shade separately, one can also request the tooth number before or after the dentist scans the associated tooth for shade determination. Because scans are separated, the starting position of the scanner is likely different and the underlying coordinate systems supporting the surface data and the spatially resolved angular distribution of color vectors will likely be different. However, the spatially resolved angular distribution of color vectors also requires a point cloud with normal and colors or equivalent 3D surface data, which can be related to the surface data from the first data acquisition through a stitching procedure. The obtained relation, usually a rigid transformation matrix, can be used to associate spatial coordinates of one or more points from the surface data with the corresponding angular distribution of color vectors.

In a third embodiment, a first data acquisition would provide both surface data and spatially resolved angular distribution of color vectors, and a second data acquisition may provide additional data for the spatially resolved angular distribution of color vectors. It may happen, that during the review of the shade obtained from the first scan, the user doesn't feel satisfied and wants to scan more. If the user goes back in the workflow to the state of the first data acquisition, then he'll also acquire more surface data, meaning additional refinement time to regenerate the final surface. In one embodiment, a separate step in the workflow is defined to alter the data contained in the spatially resolved angular distribution of color vectors without changing the surface data. No additional refinement is needed, and the fast update of the shade obtained from the spatially resolved angular distribution of color vectors can be shown to the user until he feels satisfied.

FIG. 1 is a schematic diagram that shows an imaging apparatus 90 for 3D scanning according to an embodiment of the present disclosure. A camera 16, typically a handheld digital camera, a color depth camera, handheld 3D scanner, or intra-oral 3D scanner, is scanned through the mouth of a patient 14 for acquiring a set of image data comprising reflectance images and associated depth information. A control logic processor 80, in signal communication with camera 16, obtains image data from camera 16, processes the reflectance images to assign colors to the associated depth information, and computes the placement of the associated depth information with colors onto the growing surface contour. If placement can be successfully computed, control logic processor 80 generates an updated growing surface contour and shade labels 92. Control logic processor 80 combines the growing surface, typically provided as a point cloud, and renders the surface and the resulting shade labels on a display 84 that is in signal communication with processor 80.

As was noted previously in the background section, texture characterization falls short of accurate modeling of the true color shading of a tooth. This can readily be seen in side-by-side comparisons of different views of the same tooth or shade tab having slightly different illumination.

Figure 2:
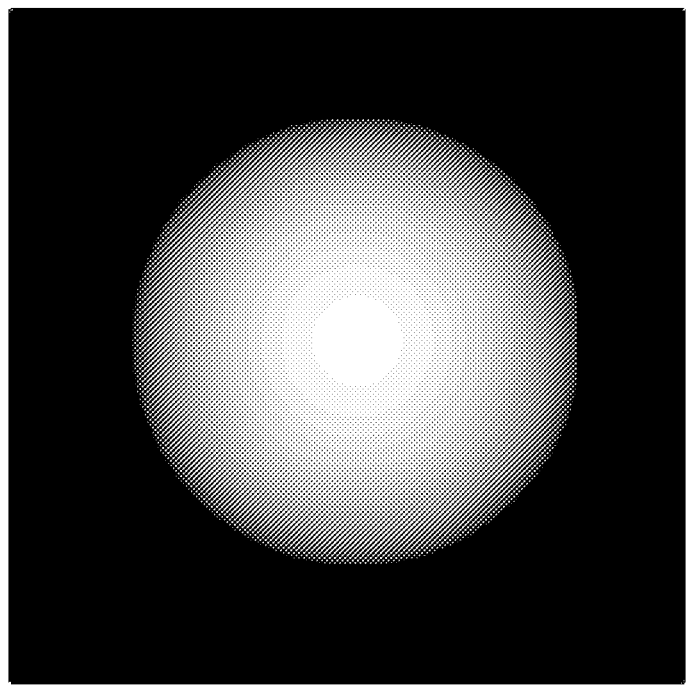
FIG. 2 shows a Lambertian sphere having uniform optical brightness.

As one of its shortcomings, texture characterization inherently fails to account for illumination and detection factors. Accurate color shade characterization for a tooth or other intraoral feature includes consideration for the surface geometry and the angle of illumination that is incident on the tooth. To illustrate effects related to shape, FIG. 2 shows a Lambertian sphere having uniform albedo, that is, uniform optical brightness response, where the ratio of reflected to incident energy is constant. In appearance, however, the intensity profile of the brightness decreases as the cosine of the surface normal relative to detection. As brightness decreases, the captured color texture changes accordingly. However, color shade is a property of the material of the object being scanned and its measurement should be independent of the illumination/observation geometry.

Embodiments of the present disclosure take advantage of the capability of an intraoral imaging device to obtain multiple reflectance images of the same feature, such as the same surface of a tooth, from different angles, as shown in FIG. 3 from an intraoral imaging camera 16. The combined angular illumination and reflectance information extracted from different images can then be used to more closely characterize the color shade of each imaged tooth or other surface feature.

Bi-Directional Reflectance Distribution Function (BRDF)

The Bi-Directional Reflectance Distribution Function (BRDF) provides a way to more accurately characterize the effects of illumination and observation at various angles on color shade. Use of this function can characterize the color shade of the material itself while reducing the confusion resulting from the contributions of illumination and detection angles. With respect to a single color, BRDF for surface characterization of a material with the scanner is expressed as a function of related variables:

$$f_r(\omega_i, \omega_r, n) = \frac{dL_r(\omega_r, n)}{dE_i(\omega_i, n)} = \frac{dL_r(\omega_r, n)}{L_i(\omega_i, n)\cos\theta_i d\omega_i}$$

wherein

L is radiance, power per unit solid angle, per unit perpendicular area;

subscript $_r$ relates to reflected light; subscript relates to incident illumination;

E is irradiance, power per unit area;

$\omega_i$ is the incident light direction;

$\omega_r$ is the reflected light direction;

n is the local surface normal at a given point

BRDF is expressed in units of inverse steradian $sr^{-1}$. The basic geometry for measurement to obtain BRDF variables for points on a surface is shown schematically in FIG. 4A. Line h is the half-direction between $\omega_i$ and $\omega_r$, described in more detail subsequently.

The generic BRDF for monochrome surface data has four dimensions, two (azimuth and zenith) per each of incident and reflected light angle. For the Applicants' system for intraoral imaging, two constraints apply:

(i) a fixed illumination and detection angle are dictated by the design of intraoral camera 16; and (ii) the BRDF data for a surface point is assumed invariant to rotation about the normal.

BRDF data for monochrome surface data can be extended to BRDF color data for a color surface data by separately considering each color channel from the color surface data. In one embodiment, an angular distribution of color vectors is represented as BRDF color data, where BRDF color data records the correspondence between the illumination direction, the reflected direction, and the surface normal on one hand, and the acquired color vector on the other hand.

In an embodiment of the present disclosure, the BRDF data are represented by a two-dimensional RGB image.

FIG. 4B shows angle geometry on the left and the content of a BRDF two-dimensional "slice" in schematic form on the right, termed a BRDF structure in the present disclosure. The two-dimensional structure is a known representation of a section of the generic BRDF having four dimensions. In the context of the present disclosure, due to the fixed illumination/sensor symmetry of the Applicant's intraoral imaging system, the BRDF structure represents the BRDF information corresponding to a color shade.

The definition of angles at the left in FIG. 4B is obtained from the half-direction h and the surface normal n. The zenith angle $\theta$ and azimuth angle $\omega$ provide polar coordinates of the surface normal n, relative to the half-direction h. The origin and direction of angle $\omega$ can be arbitrarily chosen, relative to the input directions $(\omega_i, \omega_r)$, but must be consistent with the scanner coordinate system throughout the scan.

The two-dimensional BRDF structure is defined for a half-direction or half-angle h representing the mid-vector between the illumination optical axis for incident light direction $\omega_i$ and the detector optical axis for reflected light direction $\omega_r$, as shown in FIG. 4A. In the FIG. 4B graphical representation, the horizontal axis represents the zenith angle $\theta$ between the surface normal n and the half-direction h over a range of 0 to 90 degrees, with 0 degree orientation at furthest left. The vertical axis represents the azimuth angle between the surface normal n and the half-direction h over a range of 0 to 360 degrees. This type of mapping arrangement includes the positions of standard contributions in rendering, such as specular peak, retro-reflection, and diffuse light.

Specular reflection is typically the intense bright reflection observed on metallic surfaces when the observer is opposite to the illumination with respect to the surface normal. Specular response depends primarily on surface polishing, but does not impact the selection of the block shade used for milling. Specular response often saturates the detector, compromising the value of shade measurements in that area of the two dimensional slice. This specular peak occurs when normal n and half-direction h are approximately aligned, as shown along the left side of the 2D BRDF mapping of FIG. 4B.

Diffuse response is measured over the broad range of zenith angles $\theta$ and azimuth angles $\varphi$ over most of the slice.

Grazing retroreflection is measured over a narrow range of angles where incidence $\omega_i$, reflection $\omega_r$, and half-direction h are near alignment, as designed by the handpiece geometry constraints, but the surface normal n is tilted by 90° relative to them. When modeling the physical properties, the grazing retro-reflection usually determines the type of micro-facet distribution, i.e. the surface roughness at the microscopic level. This illustrates an angular separation of various physical effects which characterize a surface appearance. Grazing retro-reflection shows properties under grazing incidence relative to the normal direction, which are not natural ways of observing a patient's teeth. In addition, depth information and therefore the surface normal are more difficult to identify and measure in such geometry.

For intraoral shade matching, the diffuse region of the FIG. 4B mapping is of the most interest. Specular and grazing retro-reflected light are of much less value, for the reasons just described.

A single point P1 in the BRDF structure shown in FIG. 4B represents the BRDF value $f_r(\omega_i,\omega_r,n)$ for each color that results from illumination at a given illumination direction $\omega_i$ at a given detector direction $\omega_r$, for a given relationship to the normal n, at the corresponding point along the surface contour.

The associated depth information with assigned colors is measured by the camera in the scanner coordinate system, which is independent of the placement of the scanner in the common coordinate system. In the scanner coordinate system, the incident and reflected light directions are constant, so that directions $\omega_i$, $\omega_r$, h are constant and only the local surface normal n depends on the associated depth information. In the scanner coordinate system, associated depth information provides the local surface normal n for a given point. The local surface normal n and the assigned colors are used to compute a BRDF value for that point. The following sections describe how the BRDF values acquired by the camera can be organized into a common coordinate system in which the growing surface contour is defined.

Surface Data and Color Assignment

With reference to the imaging apparatus 90 of FIG. 1, camera 16 acquires a set of image data comprising reflectance images and associated depth information. Control logic processor 80 processes image data to provide a surface contour with local shade indication.

In an embodiment, the reflectance images may be combined to form a color image, wherein the number of color channels is three or more. A color vector of dimension matching the number of color channels can be used to store the color values in the combined color image. In an embodiment, the sensor is monochrome and requires multiple exposures with illumination at different central wavelengths. In another embodiment, the color values are stored in an RGB color vector. Other equivalent 3D color spaces can alternately be used. For instance, for color distance, it can be advantageous to use CIELab 3D color space, which has been designed to provide a perceptually uniform color distance, according to the sensitivity of the eye. In another embodiment, if a spectrum of color channels having four or more central wavelengths is acquired, the corresponding color values are stored in color vectors.

In an embodiment, the associated depth information is also obtained by processing reflectance images using a structured illumination as described in commonly assigned U.S. Pat. No. 9,295,532 B2 entitled "3D intraoral measurements using optical multiline method" and U.S. Pat. No. 9,349,182 B2 entitled "3D intraoral measurements using optical multiline method", both to Milch, and both of which are hereby incorporated herein in their entirety. In another embodiment, the associated depth information can be obtained using a technique including, but not limited to, any of the following: triangulation using projected patterns, depth from focus using a confocal geometry, or active or passive stereophotogrammetry.

In practice, reflectance images and associated depth information are acquired as quickly as possible in order to minimize scanner displacement during the sequence of camera exposures as image data is generated. Following this procedure, the associated depth information can be related to a pixel location from the reflectance image, also termed a range image, and colors can be assigned to the range image. Pixel data from a range image can be converted to 3D point coordinates.

Scanner Orientation to Update the Growing Surface Contour

The associated depth information with colors derived from the image data is used to build a successively enhanced or growing surface contour. A point cloud with normals and colors provides suitable flexibility for point cloud development during the acquisition (fast point insertion, deletion); however, colored/textured surface meshes are generally displayed to the user on display 84 (FIG. 1).

Point cloud or mesh data structures can be used equivalently to represent the 3D surface. A point cloud with normals and colors can be extracted from a colored/texture mesh, such as by using vertices from the mesh and their average triangle normal and vertex color, discarding the triangle data. A mesh with colors can be generated from a point cloud having normals and colors using algorithms such as described in "Screened Poisson Surface Reconstruction" by Kazhdan, M., & Hoppe, in *ACM Transactions on Graphics*, 32(3), 1-13, (2013) or using a variant of Vrip, as described by Brian Curless and Marc Levoy in "A Volumetric Method for Building Complex Models from Range Images", *Proceedings of SIGGRAPH96*, adapted to take a point cloud with normal and color data as the input instead of range images from the original algorithm. Without loss of generality, the term "surface contour" can be equivalently represented using a "surface mesh" or a "surface point cloud". Conversions between point clouds and meshes are known to those skilled in the surface contour imaging arts.

According to an embodiment, both mesh and point cloud structures can be used to generate the surface contour, shown on the display. The point cloud with normals and colors is the dynamic structure, combining the information from all input stitched image data. The color mesh can be generated from the point cloud at a low resolution as a temporary structure for display. The color mesh can be regenerated with each update in order to be synchronized with the accurate point cloud with colors and normals.

The associated depth information with colors can be converted into a surface contour with colors. Normal information for each point of the surface contour can be estimated using well-known techniques in computer graphics, such as those described, for example, at the pointclouds.org website under documentation/tutorials/normal_estimation.php. At a query point, a local neighborhood of points is defined. The covariance matrix is computed using the local neighborhood of points. The covariance matrix C has the form:

$$C = \frac{1}{k}\sum_{i=1}^{k} \cdot (p_i - \overline{p}) \cdot (p_i - \overline{p})^T$$

wherein k is the number of points in the local neighborhood, $p_i$ values are the point coordinates and $\bar{p}$ is the average point location from the points in the local neighborhood. This square, symmetric 3×3 matrix can provide eigenvectors and associated eigenvalues. If a least-square fit of the local neighborhood of points is performed using an ellipsoid, the ellipsoid axes would be the eigenvectors and the axis length would be related to the corresponding eigenvalues. The smallest eigenvalue of the covariance matrix represents the shortest ellipsoid axis and the associated eigenvector gives the direction of the local normal. The direction of the local normal can be flipped if necessary to match the observation direction from the scanner. This local normal is then assigned to the query point, which allows the computation of a surface contour with normals and colors.

Stitching Procedure

The stitching procedure of the surface contour with normals and colors from the acquired image data onto the growing surface contour has the following generic steps: (i) estimate one set of feature descriptors for the surface contour with normals and colors from the image data and for the growing surface contour; (ii) perform feature matching using both sets of feature descriptors to generate a relative placement and a score; (iii) accept or reject the relative placement based on the score; (iv) refine the relative placement using an iterative closest point algorithm and generate a distance measure; and (v) accept or reject the relative placement based on the generated distance measure. Details for these steps are as follows:

(i) Feature descriptors for a surface contour represent a local surface description which is invariant to rigid transform (rotation/translation). For instance, the Fast Point Feature Histogram (FPFH) can be computed for each query point of the surface contour with normals. This is described, for example in the dissertation of Rusu, R. B., "Semantic 3D Object Maps for Everyday Manipulation in Human Living Environments", pp. 57-61, (2009, August 17)). Other descriptors can be used which also include the color information from the point cloud.

(ii) Feature matching between a set of feature descriptors from a moving surface contour with normals onto a set of feature descriptors from a target surface contour with normals involves the generation of correspondences between feature descriptors. FPFH feature descriptors are histograms and the distance can be defined as the norm of the histogram difference between two feature descriptors. A correspondence is defined as the smallest distance from one feature descriptor onto the other set of feature descriptors. Feature matching then involves the selection of a group of correspondences to generate a relative placement. This step is usually performed using the Random Sample Consensus (RANSAC) algorithm, which consists of the random selection of three correspondences to compute a candidate relative transform and then counting the number of correspondences consistent with this candidate relative transform. A correspondence is formed of two feature descriptors, one from the moving point cloud and one from the target point cloud with normals. Each feature descriptor corresponds to a query point. A correspondence is consistent with the candidate relative transform if the moving query point, moved using the candidate relative transform, is within a predefined distance from the target query point. The candidate relative transform with the highest number of consistent correspondences becomes the final relative placement. The score indicates the quality of the final relative placement and can be the corresponding number of consistent correspondences.

(iii) The relative placement may be rejected in the event that the score is below a predetermined threshold. In this case, stitching is not possible and the image data are discarded.

(iv) The refinement of the relative placement using an iterative closest point (ICP) algorithm defines point correspondences between the moving and target surface contours by finding the closest match when the relative placement is applied onto the moving surface contour. A least-square distance minimization between matches provides an update of the relative placement. The choice of point correspondences and update of the relative placement is then repeated until convergence or until a predefined number of iterations has been reached. The distance measure can be the value of the cost function used for least-square distance minimization, corresponding to the final updated relative placement.

(v) The updated relative placement can be rejected if the distance measure is below a predetermined threshold. In this case, stitching is not possible and the image data are discarded. Otherwise, stitching is successful.

If stitching is successful, the final relative placement of the surface contour with normals and colors from the image data onto the growing surface contour is known. This yields a common coordinate system for all the computed surface contours with normals and colors, into which points can be added, updated, merged, or deleted in order to create a growing surface contour. There is also the original coordinate system of the scanner, which corresponds to the axes of the image data, as originally acquired before stitching was performed. The common coordinate system is usually defined relative to an arbitrary orientation of the scanner during the acquisition of the first image data.

Sequence for Acquiring and Using BRDF for Intraoral Imaging

Figure 5:
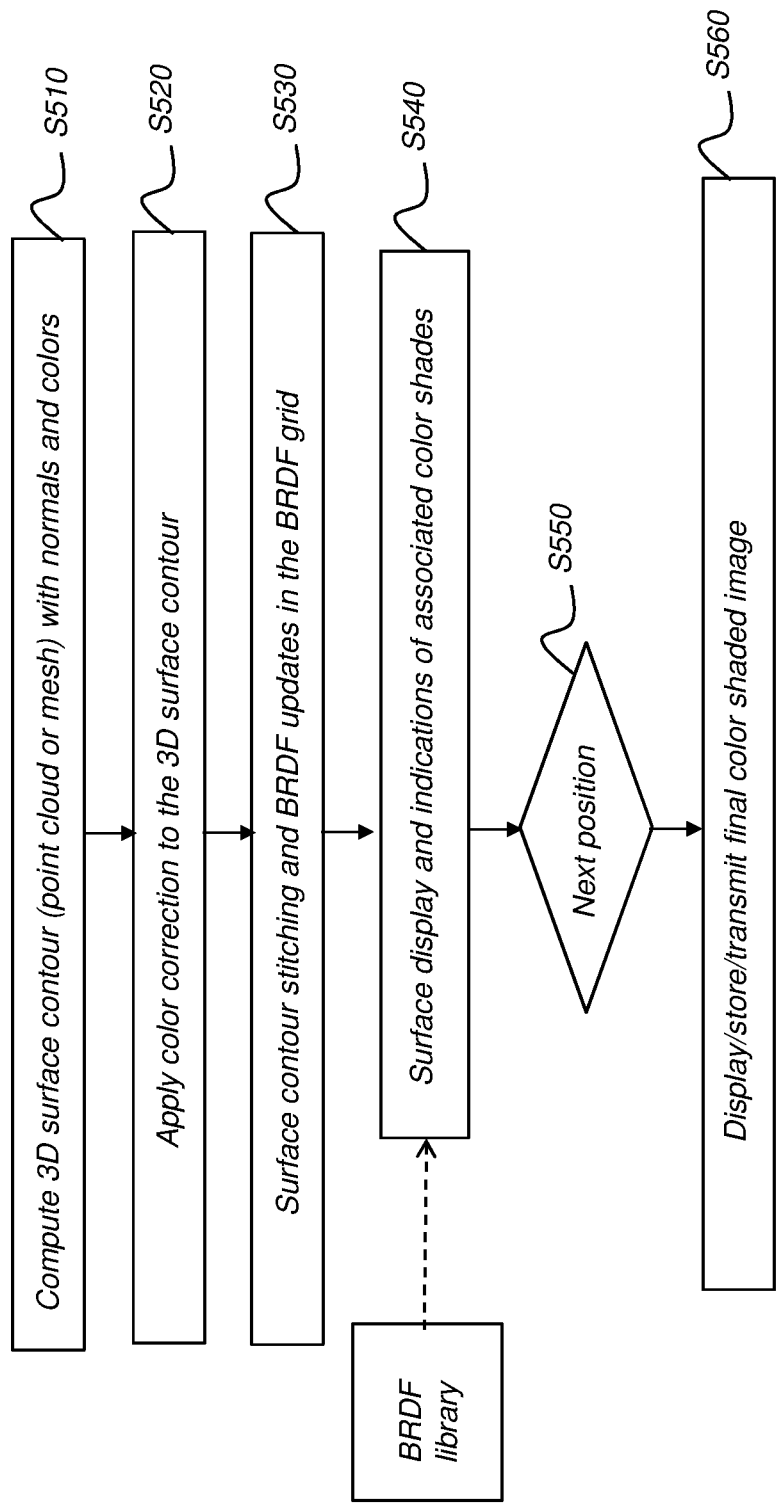
FIG. 5 is a logic flow diagram showing a sequence for acquiring and using BRDF data for improved color shading identification and display according to an embodiment of the present disclosure.

The logic flow diagram of FIG. 5 shows a sequence for acquiring and using BRDF structure for improved color shade identification and display according to an embodiment of the present disclosure. In an acquisition and processing step S510, a surface contour image is obtained as a point cloud or mesh, with normals and color information from the acquired image data. A color correction step S520 converts colors from the point cloud to BRDF color data using $f_r(\omega_i, \omega_r, n)$ for each color channel and using the illumination direction $\omega_i$ and detector direction w in the coordinate system of the scanner during acquisition of image data (before stitching). Step S520 may be postponed to a later stage, but immediate color correction in order to produce BRDF values allows a better normalization of the colors early in the processing pipeline, so that corrected colors become more accurate representations of the tooth material and less dependent on the illumination/detection geometry. Using this method, all subsequent data structures that are generated benefit from corrected color values.

Each identified point from the surface contour contains at least a spatial 3D position, a normal vector, and a color vector (typically RGB color). A stitching step S530 defines a relative position of the surface contour from the acquired image data into the coordinate system of the "growing" surface contour, that is, the surface contour being actively generated. Upon successful stitching, the spatial point position in the coordinate system of the growing surface contour can be obtained.

Spatially Varying BRDF (SVBRDF) uses a spatially resolved BRDF, which adds the point position information to the distribution function. An SVBRDF can be represented by using a regular BRDF grid structure, defined in the same coordinate system as the growing surface contour. The grid cell size (voxel size) is typically the desired spatial shade resolution, typically varying between 1 mm and 20 mm when using an intraoral scanner. The dental technician or practitioner generally separates a tooth into one to three shades, thus using a typical grid cell size of 5 mm to reach this spatial resolution. The point position after stitching provides a coordinate in the BRDF grid structure. The corresponding BRDF grid cell contains the BRDF structure to be updated.

The generic BRDF function $f_r$ (ex, n) introduced above is sampled during the scan, under various observation/measurement geometries, around a given point with normal direction n. Each sample is one of the BRDF values introduced above and those values can be stored in a BRDF structure of the same dimension as the BRDF function. For the Applicant's system, the BRDF structure is a two-dimensional image as noted previously. The update to a BRDF, coming from a point, is made in the following way: the point position and the point normal, in the scanner coordinate system, are used to compute the angular coordinates in the BRDF structure. The corresponding pixel stores a weighted sum of corrected colors together with a total weight for that pixel. The average BRDF color for that pixel can be obtained at any time by dividing the weighted sum of corrected colors by the total weight. One pixel represents an angular range of the BRDF function.

The weight corresponding to a point represents relative confidence in the measurement. A default weight can be 1 and may be decreased according to relative uncertainty in the point position, uncertainty in the point normal direction, or uncertainty from matching criterion, for example. For example, uncertainty in normal direction can be computed from the ratio between the smallest eigenvalue and the second smallest eigenvalue. If the ratio is close to 1, both eigenvalues are similar and the choice of normal is ambiguous. Above a predefined threshold, for instance 0.5, the corresponding weight for that point may be decreased. Similarly, the stitching finishes with an estimation of the distance measure, which can be compared to a predefined threshold to eventually decrease the weight for all the points in that view.

Pixel size is chosen so that the angular range is similar to the angular noise in the estimation of the normals of the point cloud. Typically, each pixel represents an angular variation of 5 to 20 degrees along each axis. In this 2D image, the horizontal and vertical axes represent the zenith and azimuth angles, respectively, between the surface normal and the half-direction.

More complex models exist, such as the Bidirectional Surface Scattering Reflectance Distribution Function (BSSRDF) or the Bidirectional Texture Function (BTF) or Bidirectional Scattering Distribution Function (BSDF). Each of these models shows various properties of the scanned object. The physical property modeled by those functions may represent reflectance, scattering and/or shadowing, or masking. These distribution functions share the same common principle of an angular resolution of the color vector, as a function of incident and reflected light directions. The term "BRDF" used herein can refer to these similar angularly resolved bidirectional distribution functions that characterize light interaction at different points along a surface.

The 2D BRDF data structure shown schematically on the right in FIG. 4B stores the color data for the BRDF. Alternatively, a model of the corresponding surface property could be stored, with values distribution for reflection as well as transmission, scattering, and shadowing. These alternative data structures can express parameters that can be adjusted to match observed colors for light at given incident and output angles.

Alternative representations for representing a particular BRDF function can be used, provided that a BRDF distance between data points can be defined as a metric. A default distance could be obtained by using the BRDF distance described below for BRDF structures sampling the BRDF function at the pixel locations defined herein.

For instance, alternative representations for a BRDF may be an analytic expression such as the Torrance-Sparrow BRDF, Cook-Torrance BRDF, the Phong BRDF which are popular in computer rendering applications. A more detailed list of BRDF models can be found in "An Overview of BRDF Models" by R. Montes and C. Urena in a technical report LSI-2012-001 from the University of Granada, incorporated herein by reference. This report describes analytic models with free parameters which are adjusted to match observations of BRDF values described in this disclosure. A typical adjustment method involves least squares minimization of the residual distance between measured BRDF values from the scanner and computed BRDF values from the analytic model.

Continuing with the FIG. 5 sequence, a contour forming step S540 forms the display of the growing surface contour, including indications of associated color shade. For each BRDF structure, an associated color shade is computed using a separate BRDF library. The BRDF library is a set containing color shade values and associated BRDF structure. The creation of the BRDF library is described in more detail subsequently.

BRDF Distance.

The evaluation of two BRDF functions at one point P1 as depicted in FIG. 4B gives two BRDF values. In the context of the present disclosure, a BRDF value is also termed a color vector. The concept of distance between the two BRDF values is defined hereafter. The BRDF distance between two BRDF functions can be defined as the integral of color distance over all permitted positions of point P1. Differently stated, the integration domain covers the angular range of input variables co, and ex.

Where a BRDF data structure is a two-dimensional image (similar to the BRDF structure shown in FIG. 4B) wherein each pixel stores a weighted sum of colors and a total weight, a BRDF snapshot can be defined as a 2D image having the average color vector (obtained by division of each pixel value by the total weight). If the total weight is zero or is below a predefined threshold, the weighted sum of colors can be considered to be unreliable. In this case, the average color vector can be replaced with an invalid color vector, such as RGB=(−1.0, −1.0, −1.0).

A BRDF structure accumulates information throughout the scan duration. The stored information represents a sum of contributions to each pixel. A BRDF snapshot performs averaging (keeping the original BRDF structure unchanged) and has a short lifetime; its data is valid only at the time it is generated, during the BRDF distance computation. As soon as new 3D points from subsequent image data affect the BRDF structure, the averages for the BRDF snapshot can be refreshed.

In a general case, color difference in any dimension can be represented as a vector difference, such as by the computed norm of the color difference. If one of the two color vectors is invalid, as described above for a value considered unreliable, the color distance can be set to a predetermined distance value. BRDF distance between two BRDF snapshots is a weighted sum of color distance for all corresponding pixels.

The weights from this weighted sum are derived from the discretization of the integral of color distances over the integration domain. For the Applicant's system, with polar coordinates used for the BRDF structure and the BRDF snapshot, the integration element (for weights) is of the form $\sin\theta d\theta d\varphi$, evaluated for the angular coordinate at the center of each pixel.

The BRDF snapshot can also be used to convert colors from the original BRDF structure (such as RGB values) to a color space that is better suited for evaluating color distance (such as the standard CIELAB color space familiar to those skilled in the imaging arts).

For a given BRDF structure, the associated color shade from the BRDF library is the shade value corresponding to the smallest distance between the BRDF snapshot from a given BRDF structure and BRDF snapshots from the associated BRDF structures inside the BRDF library.

The associated color shades are the shade values from the BRDF library for each of the BRDF structures from the BRDF grid.

The indication of associated color shades may be a label corresponding to an associated color shade. For example, a label can be the corresponding text or an arbitrary color representing the associated color shade from the BRDF library. In general, an "indication of a shade value" is a labeling that identifies a shade value. This type of labeling can be provided for multiple shade values, for instance by combining a number of text labels or color labels.

As an example, a color shade prescription for a tooth can include more than one shade, such as "D2-A2-A3", which may represent the upper-third, the middle third and the lower third of the tooth according to a particular practice. Alternately, shade values for a tooth can be indicated using text labels displayed on the surface data, where each shade value provides a text label which is shown at the points from the surface data corresponding to the angular distribution of color vectors used to determine the shade value.

According to an alternate embodiment, the indication of one or more shade values can include one or more color labels displayed on the surface data, wherein each shade value is associated to a color label that is shown at points from the surface data corresponding to the angular distribution of color vectors used to determine the shade value.

The growing surface contour and the BRDF grid are in the same coordinate system. Because of this, the associated color shades can be displayed in accordance with corresponding surface locations. If colors are used for labels, each point from the growing surface contour has corresponding coordinates in the BRDF grid and can be assigned the color of the label of the color shade from the BRDF library associated with the BRDF structure at that coordinate. In this way, all of the displayed surface contained in one BRDF cell can be rendered with the same color label. Alternatively stated, two neighboring points on the growing surface contour are very likely to correspond to the same cell in a BRDF grid (described subsequently). The two points, therefore, can be assigned the same color label. By extension, the surface area clipped by the BRDF structure can be rendered with the same color label.

If text is used for labels, the position of the text label relative to the growing surface contour may be the center of the BRDF cell in the same coordinate space. It may also be the center of the selected area by the operator.

Next position step S550 repeats the process, moving to the next set of image data from the camera for processing at step S510.

According to an alternate embodiment, surface contour generation can be completed first, using the tooth colors as originally acquired. The BRDF data is acquired, but not applied during initial surface contour generation. Surface contour stitching can then be followed by shade matching processing using acquired BRDF data. For this alternate workflow, step S540 is effectively executed after next position step S550 and its corresponding process loop.

According to an alternate embodiment, shade matching is performed following the conventional 3D scan process, so that shade data are added to existing 3D surface data. Shade matching using angular information then begins following the conventional 3D scan or can use imported 3D scan data for the patient. Stitching for shade matching using angular information is then performed against the existing surface contour. With this sequence, the operator can focus on a particular tooth or teeth to be treated. This procedure allows BRDF data acquisition and shade label display to be provided for only the region of interest for restoration, for example. In practice, the same shade acquisition sequence is followed. The initial BRDF data structures are empty, but the surface contour is non-empty.

According to another alternate embodiment, the operator can select a limited region of patient dentition for which shade labels are of interest, such as based on the treatment plan, for example. In such a case, the rendering of the shade label on the displayed surface is limited to the selected region or limited to within a predefined distance from a selected area. Selection can be performed using a pointer such as a computer mouse, using input from a tablet, or using some other digital input interface. Selection can be made before or after 3D scanning. For the latter, during the 3D scan process, shade data are generated but not displayed on the stitched surface contour. The shade-matched results can be displayed with shade indications, either on the selected region or on a separate area on the monitor screen, after the operator selects the region of interest.

According to an alternate embodiment, the shade label is some text corresponding to the shade tab from the shade library.

The stream of image data from the scanner can be stopped automatically, such as when valid information is no longer detected after a timeout period. Image data can also be stopped by the operator, such as by re-placement of the scanner back into a holder. These or similar events can be sensed in order to stop the scan. The user can then interact with the displayed surface so that the application displays, stores, or transmits the final shade-matched image. The final shade-matched image, which can be a color shaded image, for example, contains the displayed surface and the indications of the associated color shades in a display step S560.

Forming the BRDF Library

Figure 6:
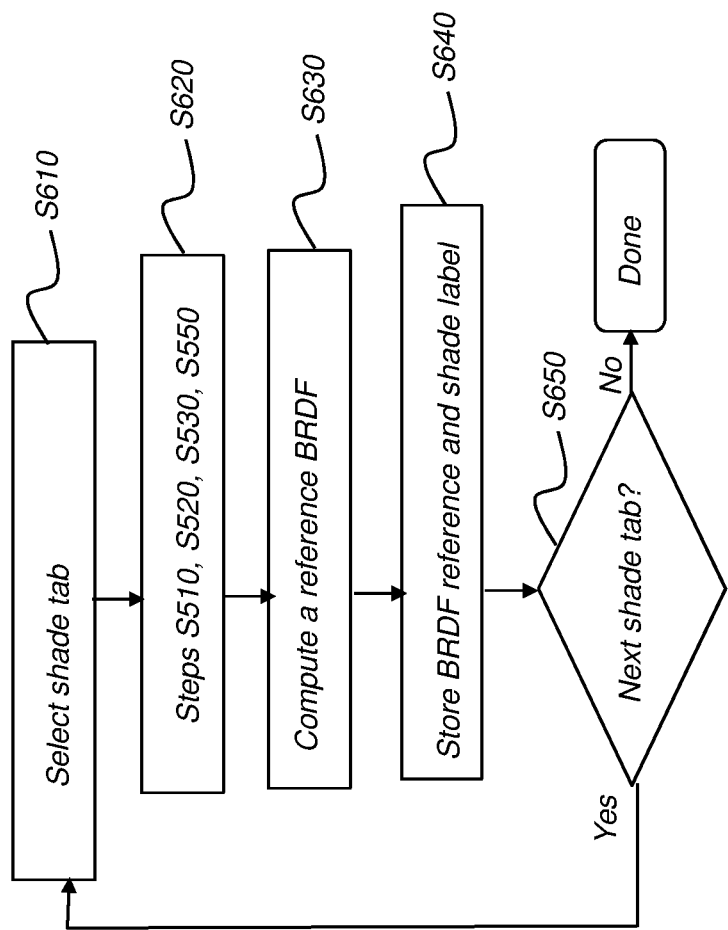
FIG. 6 is a logic flow diagram that shows steps for forming the BRDF library used in the process of FIG. 5.

The logic flow of FIG. 6 shows steps for forming the BRDF library used in the process of FIG. 5. A collection of conventional shade tabs, commercially available from suppliers of dental materials, can be used for generating the BRDF library to be used for matching values in step S540 of the FIG. 5 process. Common shade values can be obtained from the Vita Classical® shade tabs (such as "A1" "A3.5" "D2") or Vita Linearguide 3D-MASTER® (such as "2L1.5" or "3M2") for instance.

In a selection step S610, one of the shade tabs is selected for the processing that follows. A color shade association step S620 combines FIG. 5 steps S510, S520, S530 and S550, which are repeated during surface scanning of the shade tab. At the completion of scanning, a compute reference BRDF step S630 automatically combines a number of BRDF structures from the scan into a unique reference BRDF. Step S630 aligns the shade tab with a reference coordinate system that is common to all of the reference shade tabs. Step S630 further automatically selects a group of cells and sums the BRDF structures into a single BRDF structure, designated as the reference BRDF for that shade tab.

The BRDF library represents a collection of reference BRDF and their associated shade labels. The BRDF library may be pre-recorded directly at fabrication and re-used during a scan of patient teeth. The BRDF library may also be generated by the practitioner, using preferred shade tabs. The practitioner simply needs to use a 3D scanner device and follow the model outlined herein. This also allows the dentist to build a collection of shades by simply scanning them. The optical characteristics of the measurement system remain the same. The reference BRDF stored in the BRDF library may be a collection of the original BRDF data, the BRDF structure, or a fitted model. The reference BRDF can be a combination of some of the cells containing a BRDF function.

The surface contour is preferentially aligned in a similar coordinate system common to all shade tabs. Alignment is performed by stitching the growing surface contour onto a fixed reference surface of one of the shade tabs.

All shade tabs from a set have usually a similar surface profile, but their appearance shows a gradient.

The selected shade is based on industry convention. It is therefore important to align all growing surface contours into a similar coordinate system. This way, the corresponding BRDF cells in a predefined region can be selected and have a consistent meaning across the BRDF library.

Figure 9:
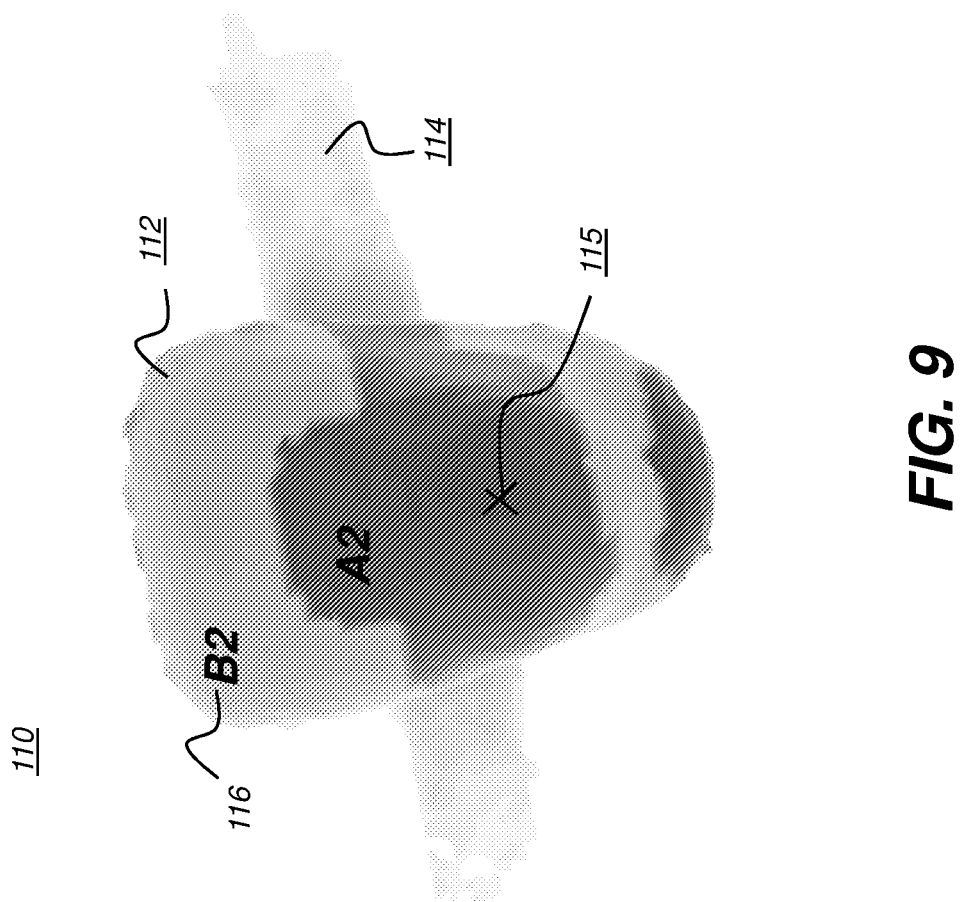
FIG. 9 shows a shade tab with the position of the reference point for building the BRDF library and with indications for detected shade.

In an embodiment, the fixed reference surface may be acquired prior to the creation of the shade library. The fixed reference surface may be manually aligned so that the axis (designated Oz) of the common coordinate system intersects the fixed reference surface at the desired position for shade measurement. This desired position is typically defined by the shade tab manufacturer. By way of example, for a Vita Classical shade tab, the desired position should be located around the X mark 115 as shown in the example of FIG. 9.

In an embodiment, the desired position may be defined automatically by the initial placement of the scanner at the beginning of the scan. As mentioned earlier, the common coordinate system during the growth of a surface contour is usually defined relative to an arbitrary orientation of the scanner during the acquisition of the first image data. This way, the manual alignment is controlled by the position of the scanner when the first image data is acquired for the fixed reference.

The reference BRDF is defined as the sum of all the BRDF structures from the selected BRDF cells in the predefined region. The sum is performed by pixelwise accumulation of all the weighted sums of colors and the total weights individually.

The statistical law of large numbers holds that collecting more observations leads to more accurate mean value, i.e. smaller standard deviation. The purpose of the pixelwise accumulation of BRDF structures in a predefined region is to obtain a more accurate mean estimation when computing the BRDF snapshot of the reference BRDF during BRDF distance measurement.

The predefined region can be a sphere of about 2 mm radius, centered about a predefined position on the reference surface. The predefined position can be the intersection of the (Oz) axis with the reference surface, for example. A storage step S640 stores each BRDF reference and the associated label in the shade library. A decision step S650 controls looping operation, for systematic processing of the entire array of shade tabs from the set. At the conclusion of measurement, the BRDF library is generated and stored. It can then be loaded prior to the start of an intraoral scan.

A sphere radius serves to define the bounds for accumulation of BRDF information. The sphere radius for the predefined region is determined based on the local variability of the shade appearance over the shade tab. At minimum, a single BRDF structure is selected from the cell containing the predefined position. Traditional workflow for shade determination usually defines, at most 3, shades for a canine, represented in bands; the radius is generally less than 5 mm to guarantee uniformity of the shade.

Figure 7:
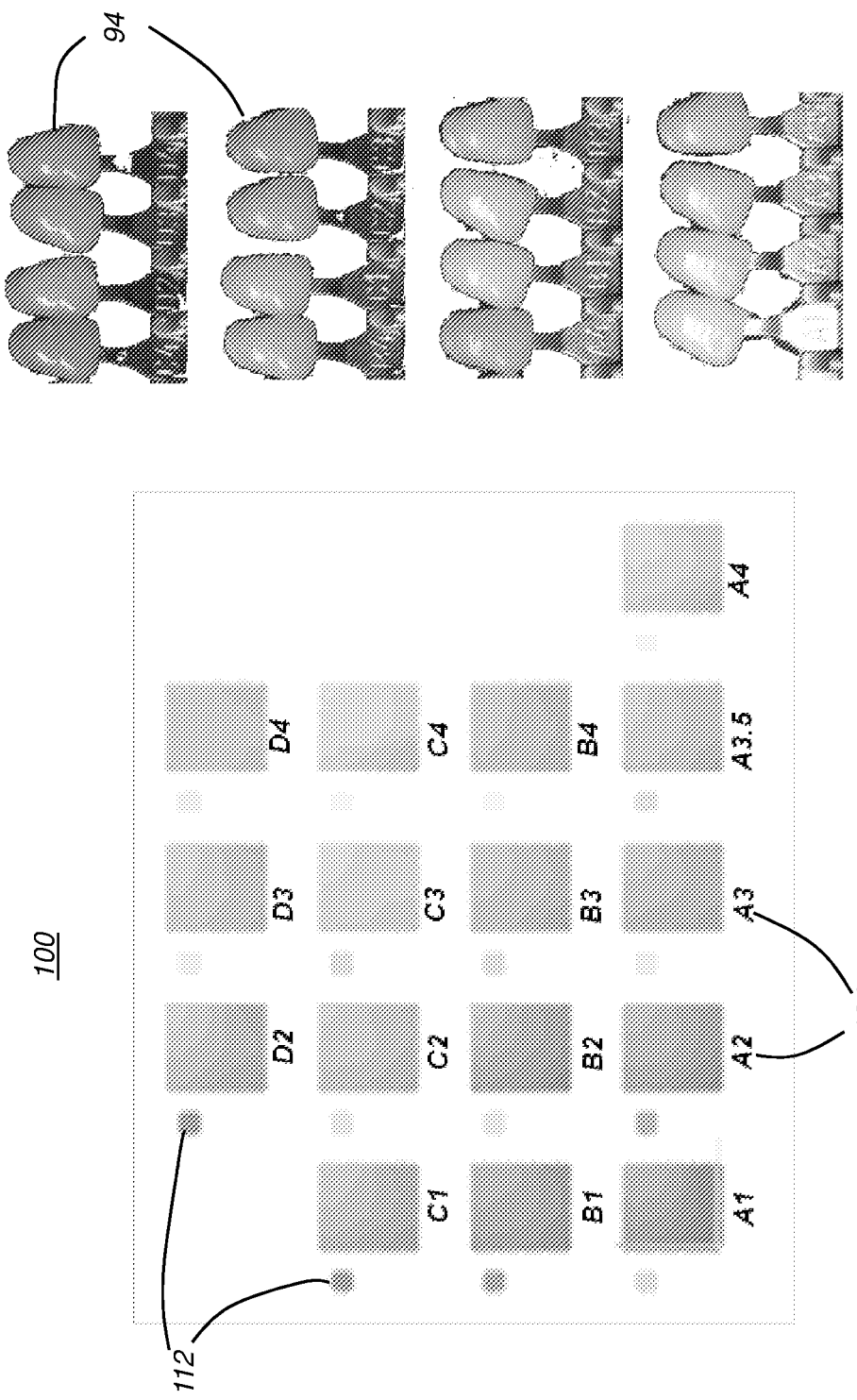
FIG. 7 is a diagram showing a set of shade tabs with corresponding BRDF snapshots.

FIG. 7 shows a set of shade tabs 94 with corresponding BRDF reference structures contained in the BRDF library 100. Each BRDF reference structure is associated with a text label also named shade label 104 (D2, D3, D4, C1, C2, C3, and so on) and/or with color label 112. Those shade labels can also be stamped or otherwise recorded on the metallic support of shade tabs 94.

For conversion into CIELab values, the signal from a white standard, defined as a surface having 90% reflectance, is acquired. Equivalently, in order to avoid saturation of the detector, the signal from an 18% reflectance standard (a N5 gray card) can also be used. The signal from the 18% reflectance standard is then multiplied by 5 to provide the equivalent of a white standard. The acquisition of a reflectance standard can be performed prior to the acquisition of the reference surface and the shade tabs for the shade library (in the FIG. 6 sequence, prior to step S610). The signal from the reflectance standard can be stored inside the shade library. Data from the reflectance standard are then available for shade acquisition and also during the scan of actual teeth, because the shade library has been loaded into the computer memory.

In practice, data for the reflectance standard is also acquired using the 3D scanner, by scanning the surface of the reflectance standard. After Steps S510 through S560 have been completed, a BRDF grid has been created. All BRDF structures from the BRDF grid can be combined into an accumulated BRDF structure, which is then converted into a BRDF snapshot. The average color vector from this BRDF snapshot provides an average reflectance standard color vector which can be used for conversion into CIELab color space. The color vector can include a spectrum with wavelengths that encompass the visible wavelengths. In the context of the present disclosure, visible wavelengths lie in the range between 360 and 830 nm.

The conversion of a color vector into a CIELab value using a reflectance standard color vector is a known procedure, which can be summarized as follows:

(1) divide each color component from the corrected color vector by the color component of the reflectance standard color vector, (2) convert this normalized color vector into a tri-stimulus XYZ value, and (3) convert the tristimulus XYZ value into a CIELab color.

The scan of the reflectance standard can provide more complex reflectance standard data. In one embodiment, the average BRDF structure of the reflectance standard is directly recorded, instead of a simple average reflectance standard color vector. When this is done, when converting color vectors from a BRDF snapshot into CIELab colors, the corresponding pixel from the BRDF snapshot of the reflectance standard can be used for color vector normalization. This technique can help account for angular variations of the reflectivity of the reflectance standard. In practice, the extended light source of the scanner, the non ideal illumination spectrum (because the illuminant is not D65) may introduce slight angular variations.

In another embodiment, the scan of the reflectance standard provides spatially resolved color data. In particular, the spatial resolution can be expressed in the coordinate system of the scanner. This allows measurement of the variations of illumination and detection across the field of view. It can be represented as a 3D grid, aligned with the coordinate system of the scanner, where X/Y axes represent the imaging plane and the Z axis represents the main optical axis of the scanner. Using a spatially resolved profile of reflectance standard color vector allows for a more correct normalization of color vectors across the field of view. This helps generate more CIELab colors which become independent of the position of the surface in the field of view.

The BRDF Grid Structure

Figure 8:
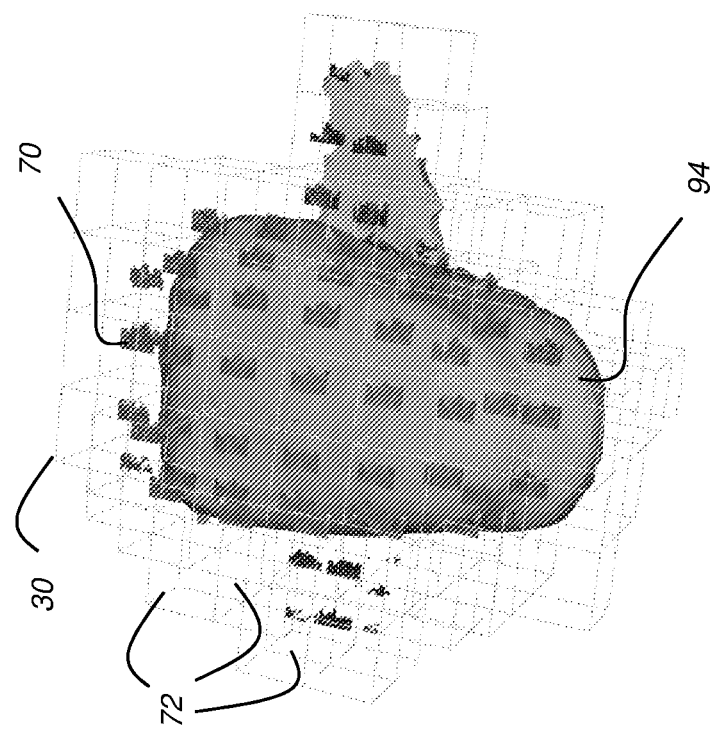
FIG. 8 is a schematic diagram showing a BRDF grid, BRDF snapshots and the growing 3D surface contour in the same coordinate system.

FIG. 8 is a diagram showing multiple elements in the same coordinate system; a 3D BRDF grid 30 composed of cells 72 define a space partition encompassing the 3D growing surface contour represented by a shade tab 94. Each cell 72 contains a BRDF structure 70 which is represented by the associated BRDF snapshot at that time during the scan. Each cell 72 corresponds to a small portion of the tooth surface, such as the surface intercepted by a single 1 mm$^3$ portion. During stitching step S530 (FIG. 5), as the point cloud with normals and colors is stitched onto the 3D growing surface contour, those points with color and normal from the point cloud corresponding to a BRDF cell 72 are combined with the BRDF data structure 70 in that cell. If necessary, the BRDF grid 30 is extended so that all stitched points fall in a valid BRDF cell 72. Then, all the points from the point cloud are combined into the growing surface contour, which is updated on display.

Update to the BRDF structure in each cell 72 entails the following:

(i) Parameters of the normal to the tooth area corresponding to the partition.

(ii) Incident direction $\omega_i$ of the illumination.

(iii) Reflected direction $\omega_r$ of the detected light.

(iv) Color vector, in a well-known color space, such as RGB, CIE Lab, or other suitable color space. The number of color channels may be more than 3.

For a given geometry composed of an incident direction $\omega_i$ of the illumination, a reflected direction $\omega_r$ of the detected light, and a local surface normal n, the BRDF structure stores an angular distribution where each element (pixel) of the angular distribution stores a weighted sum of all the color vectors and the corresponding total weight. Thus, for the given geometry, the BRDF structure can be used to compute the average color vectors, which are stored in a BRDF snapshot.

The weights used in the weighted sum of color vectors and in the corresponding total weight can relate to the confidence (or quality) level of the acquired 3D points as described previously, which represents a variable level of trust in the accuracy of 3D point position, surface normal, or color. In addition, the weights may also vary with factors that can include: (1) decrease in saturated regions (specular cone) because precise point location become uncertain, (2) decrease as the local normal tilts away from the incident light or the measurement angle, (3) increase if normals are consistent in the local neighborhood.

The geometry for illumination direction ex, reflection direction $\omega_r$, and the normal n can be encoded into a 2D angular coordinate in the BRDF structure in cell 72. A 2D image structure is used to represent the angular range of the BRDF structure. Each pixel contains a weighted sum of color vectors and an associated total weight.

The resulting data structure for a region of the tooth is likely to be incomplete because the positioning of the scanner in a measurement sequence may not explore all the various angular combinations. At the beginning of the acquisition sequence, the BRDF distance is primarily driven by the default color distance. As additional data is accumulated in the BRDF structure during the scan, the BRDF snapshots contain more valid color values and the identification of the shade from the shade library becomes more and more precise. Computation can use a minimum threshold distance, below which the associated color shade from step S540 may be invalid; in such a case, no shade label is displayed for that region of the surface. This prevents very fast change of the associated color shade at the beginning of the scan. The shade appears when sufficient orientations have been accumulated in the pixels of the BRDF structure to be meaningful. According to an embodiment, BRDF distance can be expressed in DeltaE units, a standard metric for color distance in CIELab color space. It is assumed that 50% of dental practitioners can visually detect a difference of 3 DeltaE (3 ΔE). The threshold for the maximum distance below which the associated color shade is invalid can then be set to 3 DeltaE or similar value (typically between about 1 DeltaE and 8 DeltaE).

BRDF data can be stored in memory or generated as needed from the intraoral camera and scanning apparatus. FIG. 8 provides one visualization of the data structures that can be used for accumulating and organizing the BRDF data acquired for a tooth resulting from step S540. It can be appreciated that such data structures themselves need not be visible to the operator.

Frequently, specular reflection saturates values from the image data, meaning that the associated depth information has no valid data for areas corresponding to specular reflection. There is no point and therefore no normal to compute coordinate in the corresponding BRDF structure after stitching of the rest of the surface contour. In case associated depth information is still available, close to the outer limit of the region of specular reflection, the depth information is frequently incorrectly estimated in that area. This means the normals may be very noisy. It may also happen that the reflectance images from the image data are saturated even if depth information is valid. Saturation happens because the dynamic range of the sensor is not sufficient. It is better to reject those erroneous measurements than to store them in the BRDF structure. Rejection can be implemented by setting a rejection threshold on the cosine of the point normal and the half-direction (for instance rejected if above 0.98). Another implementation would reject storage in the BRDF structure if the color of the point from the point cloud with colors and normals is close to saturation values of the camera (for instance if all color channels are above a value 250 for a range of the camera going up to 255). The reference BRDF obtained from a shade tab 90 can be stored, for example, as an element of the BRDF library, as described previously with reference to the logic flow diagram of FIG. 6.

An embodiment of the present disclosure adjusts the standard BRDF relationship at step S520 to the following:

$$f_r(x, \omega_i, \omega_o, n) = kE_{pix} \frac{r^2_{led \to x} r^2_{x \to pix}}{(\omega_i \cdot n)}$$

wherein k is a constant term provided that the illumination is constant, and scanner geometry remains constant; value $E_{pix}$ is measured irradiance (i.e. proportional to the camera pixel value, the observed color for a particular color channel); the dot product of co, and n gives the cosine angle between the local normal and the illumination direction; and $r^2$ terms are quadratic distances from the scanner components to the surface position. The above formula can be used when converting the original point cloud colors into corrected colors. The formula is derived from the generic definition $f_r(\omega_i, \omega_r, n)$ given previously in the present disclosure. The quadratic distance terms are corrections due to the variation of solid angle with distance. The cosine correction from the dot product comes from the denominator in the original definition of $f_r(\omega_i, \omega_r, n)$. This color correction can be applied to each color channel individually.

An improved measurement of the distance between two BRDF structures could use an underlying model defined by a fixed number of parameters. A paper by M. Langovoy et al. gives a possible implementation: "Novel metric for analysis, interpretation and visualization of BRDF data", *ACM Transaction on Spatial Algorithms and Systems* (2014). (See eq (8) or (15) as examples of a metric). This implies fitting the recorded 2D BRDF structure onto a model by optimizing parameters and then computing a distance between those models.

The presently disclosed embodiments are therefore considered in all respects to be illustrative and not restrictive. The scope of the invention is indicated by the appended claims, and all changes that come within the meaning and range of equivalents thereof are intended to be embraced therein.

FIG. 9 shows a surface contour with shade indications, where the surface contour corresponds to a shade tab. A typical position of the reference position 115 for building the BRDF library is shown together with examples of shade indications using a text label 116 and a color label 112 for detected shades. A portion of the growing surface contour 114 is shown. FIG. 9 represents a possible representation 110 of the 3D surface contour together with labels for the identified color shades, from Step S540. For each cell of the BRDF grid, each BRDF structure can provide one shade value. If the shade value is successfully identified, the surface in the corresponding region of space is rendered with a label 112 associated with that shade value. For example, the A2 shade from Vita Classical® shade tabs can be rendered using a light green, which is its arbitrary predefined color label.

The BRDF grid leads to a spatial variation of the label on the representation of the 3D surface with labels. If the determination of a shade value is not successful because the smallest BRDF distance is larger than a predetermined distance threshold, the surface is not rendered with any label and therefore retains its original appearance of a colored mesh or textured mesh 114, since the colors or texture are independent of the BRDF shade library. In this example, the original appearance of a colored mesh 114 results from the fact that this metallic surface does not correspond to any similar material present in the BRDF library.

According to an embodiment of the present disclosure, intraoral imaging apparatus 90 of FIG. 1 acquires a 3D tooth surface representation and acquires a spatially resolved angular distribution of color vectors, wherein the spatially resolved angular distribution of color vectors associates one or more point positions from the surface data to the corresponding angular distribution of color vectors. Processor 80 obtains the tooth surface representation and is programmed with processing logic instructions to identify one or more shade values, wherein each shade value is associated with one angular distribution of color vectors from the spatially resolved angular distribution of color vectors, by comparing the angular distribution of color vectors to a set of reference angular distributions of color vectors, wherein each reference angular distribution in the set is associated with a corresponding shade value. Display 84 then displays the 3D tooth surface representation and displays an indication of the identified shade values.

Consistent with one embodiment, the present invention utilizes a computer program with stored instructions that control system functions for image acquisition and image data processing for image data that is stored and accessed from an electronic memory. As can be appreciated by those skilled in the image processing arts, a computer program of an embodiment of the present invention can be utilized by a suitable, general-purpose computer system, such as a personal computer or workstation that acts as an image processor, when provided with a suitable software program so that the processor operates to acquire, process, transmit, store, and display data as described herein. Many other types of computer systems architectures can be used to execute the computer program of the present invention, including an arrangement of networked processors, for example.

The computer program for performing the method of the present invention may be stored in a computer readable storage medium. This medium may comprise, for example: magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure.

Memory is also used as the data workspace for executing and storing intermediate and final results of calculations and other processing. Computer-accessible memory can be volatile, non-volatile, or a hybrid combination of volatile and non-volatile types.

It is understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail and may have been described with particular reference to a suitable or presently preferred embodiment, but it will be understood that variations and modifications can be affected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for intraoral 3D scanning comprising:
   a) obtaining a 3D tooth surface representation using an intraoral scanner wherein the 3D tooth surface representation comprises surface data and a spatially resolved angular distribution of color vectors, wherein the spatially resolved angular distribution of color vectors comprises an angular distribution of color vectors for each of a plurality of point positions from the surface data and wherein each angular distribution of color vectors is a function characterizing light interaction and a color vector;
   b) comparing the angular distribution of color vectors for at least one of the plurality of point positions to a set of reference angular distributions of color vectors to identify a shade value for the at least one of the plurality of point positions, wherein each reference angular distribution of color vectors in the set is a function characterizing light interaction and is associated with a corresponding shade value; and
   c) displaying, storing, or transmitting the surface data with an indication of the shade value identified for the at least one of the plurality of point positions.

2. The method of claim 1 wherein the angular distribution of color vectors comprises at least one of an incident illumination direction, a reflected light direction, a surface normal, and a position on the tooth surface.

3. The method of claim 1 wherein the color vectors include red, green, and blue color data values.

4. The method of claim 1 wherein the color vectors include CIELab color data values.

5. The method of claim 1 wherein the color vectors include a spectrum with wavelengths covering the visible wavelengths.

6. The method of claim 1 wherein the set of reference angular distributions of color vectors and corresponding shade values is acquired from measurements of a set of dental shade tabs.

7. The method of claim 1 wherein each angular distribution of color vectors comprises bidirectional reflectance distribution function values.

8. The method of claim 1 wherein each angular distribution of color vectors comprises spatially varying bidirectional reflectance distribution function values (BRDF).

9. The method of claim 1 wherein each angular distribution of color vectors comprises Bidirectional Surface Scattering Reflectance Distribution Function (BSSRDF) or Bidirectional Scattering Distribution Function values (BSDF).

10. The method of claim 1 wherein the 3D tooth surface representation comprises a point cloud or a triangle mesh or a surface spline.

11. The method of claim 1 wherein one or more of the identified shade values is a text label or a color-coded label or a spatial profile of the shade variation over the tooth surface.

12. The method of claim 1 wherein the one or more identified shade values corresponds to at least one of an upper, middle, or lower third of the tooth surface.

13. The method of claim 1 wherein comparing the angular distribution of color vectors for each of the at least one of the plurality of point positions to the set of reference angular distributions of color vectors comprises calculating a color distance between two color vectors.

14. The method of claim 1 wherein identifying the shade value for the at least one of the plurality of point positions comprises identifying shade values on all tooth surfaces on the 3D tooth surface representation.

15. The method of claim 1 wherein identifying the shade value for the at least one of the plurality of point positions comprises identifying shade values on selected region within the 3D tooth surface representation.

16. The method of claim 1 wherein the surface data is obtained during data acquisition or is generated as part of a refinement step.

17. The method of claim 1 wherein the surface data and the spatially resolved angular distribution of color vectors are obtained from the same data acquisition.

18. The method of claim 1 wherein the surface data and the spatially resolved angular distribution of color vectors are obtained from separate data acquisitions.

19. The method of claim 1 further comprising obtaining a scan signal from a reflectance standard, wherein the scan signal provides a color vector or a bi-directional reflectance distribution function (BRDF) structure.

20. The method of claim 19 wherein the scan signal is spatially resolved over a field of view of the intraoral scanner.

21. A method for intraoral 3D scanning comprising:
   obtaining a 3D tooth surface representation using an intraoral scanner, wherein the 3D tooth surface representation comprises surface data and a spatially resolved angular distribution of color vectors, wherein the spatially resolved angular distribution of color vectors comprises an illumination direction, a reflected light direction, a surface normal and a color vector for each of a plurality of points on the 3D tooth surface representation;
   for one or more of the plurality of points, identifying a color shade value by identifying a corresponding angular distribution of color vectors within a set of predefined reference angular distributions of color vectors, wherein each reference angular distribution of color vectors has a corresponding color shade value; and displaying, storing, or transmitting at least a portion of the tooth surface representation with identification of one or more of the associated color shades.

22. An intraoral imaging apparatus comprising:

an image capture apparatus that acquires a 3D tooth surface representation and acquires a spatially resolved angular distribution of color vectors, wherein the spatially resolved angular distribution of color vectors comprises an angular distribution of color vectors for each of a plurality of point positions from the 3D tooth surface representation and wherein each angular distribution of color vectors is a function characterizing light interaction and a color vector;

a processor that obtains the tooth surface representation and that is programmed with processing logic instructions to compare the angular distribution of color vectors for at least one of the plurality of point positions to a set of reference angular distributions of color vectors to identify a shade value for the at least one of the plurality of point positions, wherein each reference angular distribution of color vectors in the set is a function characterizing light interaction and is associated with a corresponding shade value; and a display that displays the 3D tooth surface representation and displays an indication of the identified shade values.

* * * * *